United States Patent
Kitamura

(10) Patent No.: US 8,155,075 B2
(45) Date of Patent: Apr. 10, 2012

(54) WIRELESS COMMUNICATION SYSTEM, MOBILE STATION AND HANDOVER CONTROL METHOD

(75) Inventor: Tsutomu Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 798 days.

(21) Appl. No.: 11/662,096

(22) PCT Filed: May 24, 2005

(86) PCT No.: PCT/JP2005/009476
§ 371 (c)(1), (2), (4) Date: Mar. 7, 2007

(87) PCT Pub. No.: WO2006/027874
PCT Pub. Date: Mar. 16, 2006

(65) Prior Publication Data
US 2008/0170546 A1    Jul. 17, 2008

(30) Foreign Application Priority Data
Sep. 8, 2004   (JP) ................... 2004-261224

(51) Int. Cl.
*H04W 4/00*    (2009.01)
(52) U.S. Cl. .......... 370/331; 455/418
(58) Field of Classification Search .......... 370/310–338, 370/431–463; 455/418–420, 436–444
See application file for complete search history.

(56) References Cited

U.S. PATENT DOCUMENTS

| | | | |
|---|---|---|---|
| 4,849,975 A | 7/1989 | Patel | |
| 7,046,647 B2 * | 5/2006 | Oba et al. | 370/331 |
| 7,502,348 B2 * | 3/2009 | Zhang et al. | 370/331 |
| 2001/0023460 A1 * | 9/2001 | Boucher et al. | 709/250 |
| 2004/0077341 A1 * | 4/2004 | Chandranmenon et al. | 455/418 |

(Continued)

FOREIGN PATENT DOCUMENTS

EP   0 316 063   5/1989

(Continued)

OTHER PUBLICATIONS

Sethom et al. Adaptation Interface for Seamless Handover between 802.20MBWA/802.11/802.15. IEEE 802.20 Working Group on Mobile Broadband Wireless Access. Nov. 5, 2003.*

Primary Examiner — Kent Chang
Assistant Examiner — Kashif Siddiqui
(74) Attorney, Agent, or Firm — McGinn IP Law Group, PLLC

(57) ABSTRACT

A processing capability for data communication with a packet terminal is secured while packet loss is prevented, and a load to a mobile station in a handover is reduced. A wireless communication system comprises mobile stations 101 and 102 each having a wireless interface a configured with an antenna 11a and a wireless transmission/reception unit 12a as well as a wireless interface b configured with an antenna 11b and a wireless transmission/reception unit 12b, MAC addresses being assigned to the wireless interfaces, and base stations 201 and 202 for performing data transfer with the mobile stations 101 and 102, a L2SW 302 for switching base stations that performs the data transfer, and a packet terminal 401 for performing the data communication with the mobile stations 101 and 102. When the mobile stations 101 and 102 perform the handover, a data transfer MAC address assigned to the wireless interface (one of a and b) is reassigned to the other wireless interface.

21 Claims, 4 Drawing Sheets

U.S. PATENT DOCUMENTS

2006/0221900 A1* 10/2006 Zhang et al. .................. 370/331
2006/0221901 A1* 10/2006 Yaqub et al. .................. 370/331

FOREIGN PATENT DOCUMENTS

| JP | 9-307941 | 11/1997 |
| JP | 2790550 | 6/1998 |
| JP | 11-55721 | 2/1999 |
| JP | 2002-359623 | 12/2002 |
| JP | 2003-304569 | 10/2003 |
| JP | 2004-48334 | 2/2004 |

* cited by examiner

RELATED ART

WIRELESS COMMUNICATION SYSTEM, MOBILE STATION AND HANDOVER CONTROL METHOD

TECHNICAL FIELD

The present invention relates to a wireless communication system, a mobile station and a handover control method for realizing a seamless handover without any packet loss in a mobile station.

BACKGROUND ART

If a mobile station having only one wireless interface performs a handover in a wireless communication system, the mobile station searches a handover destination base station after disconnecting a connection with a base station being currently connected. Next, the mobile station selects the handover destination base station and connects to it from a base station found through the search. Therefore, with this procedure, the mobile station enters into an unconnected state with the base station at least while performing a connection procedure with the handover destination base station, which causes packet loss.

On the other hand, if a mobile station having two wireless interfaces performs the handover, while using one wireless interface to perform data transfer with the base station, the mobile station can use the other wireless interface to search a handover destination base station and connect to it. The mobile station can perform the handover after the connection with the handover destination base station has been completed, and the mobile station is connected to the base station even while performing the connection procedure with the handover destination base station. Therefore, a seamless handover can be realized without the unconnected state and the packet loss due to the unconnected state can be prevented. However, if the mobile station uses the two wireless interfaces, the mobile station needs to be equipped with means for merging received packets into one when the packets are received from the respective wireless interfaces, and means for sorting packets to be sent to the respective wireless interfaces.

However, when the handover is performed in the mobile station having the two wireless interfaces, different MAC addresses are to be fixedly assigned to each wireless interface, which causes the following problems.

The first problem is that since the different MAC addresses are fixedly assigned to each wireless interface, when a packet terminal connected to the mobile station performs data communication, the packet terminal must constantly identify and control multiple wireless interfaces during the data communication.

In order to solve this problem, it is conceivable to use a method of mounting a function on the packet terminal with which the multiple wireless interfaces can be dynamically recognized. However, it increases strains on the packet terminal and reduces a processing capability for the data communication.

Patent Document 1 (Japanese Patent No. 2790550) discloses a gateway device that has a high transfer processing capability and performs a packet routing among multiple local networks connected to each other. A network control unit of the gateway device determines a carrier route for a received packet, reassigns a MAC address of the packet according to the carrier route, and thereby realizes a packet transmission according to the reassigned MAC address. However, a process of reassigning the MAC address is not intended to work with the base station search process caused by a move of the mobile station. Therefore, when the packet terminal performs the data communication with the mobile station, the packet terminal cannot dynamically recognize the multiple wireless interfaces, and thus the first problem cannot be solved.

The second problem is depicted in FIG. 1. A wireless communication system, in which multiple base stations 201, 202 and 203 are connected to a layer 2 switch (L2SW (301)) that is a line concentrator having a switching function shown in FIG. 1, is taken as an example. A mobile station 101 is mounted with two wireless interfaces: namely, a wireless interface "a" including an antenna 11a and a wireless transmission unit 12a, and a wireless interface "b" including an antenna 11b and a wireless transmission unit 12b. It is assumed that the wireless interface a has been assigned with a MAC address xx:xx:xx:xx:xx:xx, and the wireless interface b has been assigned with a MAC address yy:yy:yy:yy:yy:yy.

If the mobile station 101 uses the wireless interface a to establish connection with the base station 201 and performs data transfer, the L2SW (301) updates information in a forwarding table FT for storing information on a forwarding process, with respect to the MAC address xx:xx:xx:xx:xx:xx. Next, when the mobile station 101 moves and performs the handover from the base station 201 to the base station 202, the mobile station 101 uses the wireless interface b to connect to the base station 202 and starts the data transfer. At this point, the L2SW (301) updates the information in the forwarding table FT, with respect to the MAC address yy:yy:yy:yy:yy:yy.

When using this method, if a frame having a destination MAC address of xx:xx:xx:xx:xx:xx arrives at the L2SW (301), the L2SW (301) refers to the forwarding table FT based on the MAC address xx:xx:xx:xx:xx:xx. Accordingly, even though the mobile station 101 is connected to the base station 202, the L2SW (301) transfers the data to the base station 201, thereby causing a problem of packet loss.

In order to solve this problem and to communicate with a mobile station having two wireless interfaces, a router may be installed on the base station side to deal with the mobile station's addresses and the handover will be performed. However, layer 3 connection control is required for managing a location of the mobile station. As a result, a strain required for the handover by the mobile station becomes larger compared with that caused by layer 2 control, and a data transfer processing capability deteriorates.

Patent Document 2 (Japanese Patent Application Laid-Open No. 2004-048334) discloses a data transfer apparatus and the like which enable uninterrupted data transfer when performing the handover in a mobile node (corresponding to the mobile station). For a switch installed at a higher level of multiple access points (corresponding to the base stations), the seamless handover is realized with a bi-cast transmission method, in which a packet bound for the mobile node is sent to both an access point being connected and an access point of a destination. However, the load required for the handover in the mobile node becomes large in association with previously sending the packet to both, and the second problem cannot be solved.

DISCLOSURE OF THE INVENTION

Problems to be Solved

In view of the above situation, the present invention aims to secure a processing capability for data communication with a packet terminal while eliminating packet loss, and to reduce a strain on a mobile station during a handover process.

Means of Solving Problems

An aspect of the present invention for solving the above described problems is a wireless communication system comprising a mobile station having two or more wireless interfaces to which addresses are assigned, a base station for performing data transfer with the mobile station via the wireless interfaces, a switch for connecting to the base station and switching base stations with which the data transfer is performed, and a terminal for performing data communication with the mobile station, wherein when the mobile station performs a handover, a data transfer address assigned to one of the wireless interfaces is reassigned to another wireless interface.

Another aspect of the present invention is a mobile station having two or more wireless interfaces to which addresses are assigned, comprising handover control means for controlling a series of processes related to a handover, address reassignment means for reassigning an address assigned to a wireless interface to another wireless interface, and address storage means for storing addresses, wherein when the handover is performed, the address reassignment means reassigns a data transfer address assigned to one of the wireless interfaces to another wireless interface.

This mobile station further includes handover trigger detection means for detecting a condition related to the handover as a trigger, wherein when the handover trigger detection means detects the trigger, the handover control means performs processes related to the handover. The condition is based on a radio wave intensity received by the wireless interface from a base station, and the handover process may be performed when the received radio wave intensity received from another base station is larger than the received radio wave intensity received from a base station being connected.

Moreover, this mobile station further comprises communication control means for performing data communication with a terminal and controlling the communication, wherein, for the data communication with the terminal during the handover, the communication control means performs communication control including merging of received data, apportioning of data and a combination thereof.

Another aspect of the present invention is a handover control method comprising searching a base station in a waiting state by using a base station search address assigned to one of wireless interfaces in a mobile station, reassigning a data transfer address to one of the wireless interfaces in the mobile station, performing a location registration for the mobile station by a switch that has received data on a location of the mobile station from the wireless interface to which the data transfer address is assigned, and breaking connection with a base station that is in a connection state through one of the wireless interfaces in the mobile station.

According to the present invention, it is possible to secure the processing capability for the data communication with the packet terminal while packet loss is prevented, and to reduce loads to the mobile station in the handover.

BEST MODE FOR CARRYING OUT THE INVENTION

Hereinafter, the best mode for carrying out a wireless communication system of the present invention will be described. The drawings submitted concurrently with this specification will be referred to in the following description.

<Configuration>

FIG. 2 shows an overall block diagram of a wireless communication system. This wireless communication system is configured with multiple mobile stations 101 and 102, multiple base stations 201 and 202, a L2SW (301) and a packet terminal 401.

The mobile stations 101 and 102 are mounted with two wireless interfaces, an antenna 11a and a wireless transmission/reception unit 12a, and an antenna 11b and a wireless transmission/reception unit 12b, for receiving and transmitting radio signals. Each wireless interface has been assigned with a reassignable MAC address. The mobile stations 101 and 102 perform a handover process while moving, and establish connection states with the multiple base stations 201 and 202 based on layer 2 connection control. In addition, the mobile stations 101 and 102 send packets to and receive packets from the packet terminal 401 to perform data communication.

The L2SW (301) connects to the multiple base stations 201 and 202, and is a line concentrator having a switching function. The L2SW (301) is mounted with a forwarding table FT for storing information on a forwarding process, and updates the information in the forwarding table FT with respect to the MAC addresses assigned to the wireless interfaces of the mobile stations 101 and 102, according to a switching process.

FIG. 3 shows an internal configuration block diagram of the mobile station 101 and an internal configuration block diagram of the packet terminal 401. The other mobile station 102 is assumed to have a similar configuration. This mobile station 101 has the antenna 11a and the wireless transmission/reception unit 12a, as well as the antenna 11b and the wireless transmission/reception unit 12b, as the two wireless interfaces for transmitting and receiving the wireless signals, and also a communication control unit 13, a handover detection unit 14, a handover control unit 15, a MAC address reassignment unit 16 and a MAC address storage unit 17. In addition, the packet terminal 401 has a communication control unit 41 and establishes the data communication with the communication control unit 13 of the mobile station 101.

The communication control unit 13 has a function of merging data received by the wireless transmission/reception units 12a and 12b and sorting data to be transmitted to the wireless transmission/reception units 12a and 12b, and also has a communication control function of performing communication control of user data for the packet terminal 401.

The handover detection unit 14 has a function of monitoring radio waves received by the wireless transmission/reception units 12a and 12b and detecting a trigger for performing a handover. The handover control unit 15 controls operation processes related to the handover at the respective units.

The MAC address reassignment unit 16 has a function of reassigning the MAC addresses used in the wireless transmission/reception units 12a and 12b. The MAC address reassignment unit 16 reassigns a MAC address to the other wireless transmission/reception unit when the handover is performed. The MAC address storage unit 17 has a function of storing MAC addresses used in the wireless transmission/reception units 12a and 12b.

Two MAC addresses to be used in the two wireless interfaces mounted on each of the mobile stations 101 and 102 are used as a base station search MAC address for search for a base station, and a data transfer MAC address for transfer of data, respectively. The MAC addresses are stored in the MAC address storage unit 17. A MAC address reassignment control with respect to the wireless transmission/reception units 12a and 12b is performed by the handover control unit 15 sending a MAC address reassignment message to the MAC address reassignment unit 16. The handover control unit 15 manages states of the respective wireless transmission/reception units 12*a* and 12*b*, and performs the handover control while reassigning the MAC addresses with respect to the respective wireless transmission/reception units 12*a* and 12*b*, based on a sequence chart shown in FIG. 4.

<Operations>

Hereinafter, operations related to the handover control with the MAC address reassignment will be described with reference to the sequence chart of FIG. 4. For simplification of the description, the case will be described where the mobile station 101 moves from the base station 201 toward the base station 202.

When the mobile station 101 is using the antenna 11*a* and the wireless transmission/reception unit 12*a* to connect to the base station 201, the wireless transmission/reception unit 12*a* uses the data transfer MAC address to transfer the data. Therefore, the wireless transmission/reception unit 12*b* is in a disconnection state with the respective base stations 201 and 202. On the other hand, according to a switching operation by the L2SW (301), the base station 201 is connecting to the mobile station 101, and the base station 202 is waiting.

The mobile station 101 uses the wireless transmission/reception unit 12*b* being unused for the data transfer to start searching a base station. When the base station search is started, the handover control unit 15 sends a request to reassign the base station search MAC address in the wireless transmission/reception unit 12*b* to the MAC address reassignment unit 16 (S1). When the MAC address reassignment unit 16 receives the request, the MAC address reassignment unit 16 sets a base station search MAC address obtained from the MAC address storage unit 17 for the wireless transmission/reception unit 12*b* (S2). When the handover control unit 15 receives a completion of the MAC address reassignment from the MAC address reassignment unit 16 (S3), the handover control unit 15 sends a request to start the base station search to the wireless transmission/reception unit 12*b* (S4).

When the wireless transmission/reception unit 12*b* receives the request to start the base station search, the wireless transmission/reception unit 12*b* uses the base station search MAC address to start the base station search (S5). The mobile station 101 receives a base station search response returned from the base station (referring to the base station 202 in this case). When the wireless transmission/reception unit 12*b* receives the base station search response (S6), the wireless transmission/reception unit 12*b* notifies the handover trigger detection unit 14 of a communication quality parameter, for example, such as a radio wave intensity or the like (S7). The handover trigger detection unit 14 monitors the communication quality parameter notified from each base station, and if a predetermined handover condition has been satisfied, the handover trigger detection unit 14 sends information that a handover destination base station was found to the handover control unit 15 and notifies it of the handover destination base station 202 (S8).

An example of detection of a trigger related to the handover is the case where the handover trigger detection unit 14 monitors a received radio wave intensity as the communication quality parameter, and determines that the handover condition has been satisfied if the received radio wave intensity from another base station has become larger than the received radio wave intensity from the base station being currently connected.

When the handover control unit 15 receives the information on the handover destination base station, the handover control unit 15 sends a request to reassign the data transfer MAC address in the wireless transmission/reception unit 12*b* to the MAC address reassignment unit 16 (S9). When the MAC address reassignment unit 16 receives the request, the MAC address reassignment unit 16 sets the data transfer MAC address, which was obtained from the MAC address storage unit 17, to the wireless transmission/reception unit 12*b* (S10). When the handover control unit 15 receives a signal reporting completion of the MAC address reassignment from the MAC address reassignment unit 16 (S11), the handover control unit 15 sends to the wireless transmission/reception unit 12*b* a request to start connecting to the base station (S12).

When the wireless transmission/reception unit 12*b* receives the request to start connecting to the base station, the wireless transmission/reception unit 12*b* starts connection with the base station 202 (S13). Then the base station 202 becomes in the connection state with the mobile station 101. When the wireless transmission/reception unit 12*b* completes the connection, the wireless transmission/reception unit 12*b* sends a signal reporting a completion of the connection to the handover control unit 15 (S14).

When the handover control unit 15 is notified of the completion of the base station connection, the handover control unit 15 sends to the wireless transmission/reception unit 12*b* a request that a data transfer start be set (S15). When the wireless transmission/reception unit 12*b* receives the request, the wireless transmission/reception unit 12*b* enters into a state where it can start the data transfer. Next, the wireless transmission/reception unit 12*b* sends to the handover control unit 15 a signal reporting completion of setting the data transfer start (S16). When the handover control unit 15 is notified of the completion of setting the data transfer start, the handover control unit 15 sends a request to register a location to the wireless transmission/reception unit 12*b* (S17). When the wireless transmission/reception unit 12*b* receives the request to register the location, the wireless transmission/reception unit 12*b* sends a location registration frame via the base station 202 (S18) to the switch 301 (S19). The switch 301 updates the forwarding table FT after receiving the location registration frame, and starts to switch a frame having a destination MAC address, which is the data transfer MAC address, to the base station 202.

When the wireless transmission/reception unit 12*b* finishes registering the location in the switch 301, the wireless transmission/reception unit 12*b* sends a signal reporting completion of the location registration to the handover control unit 15 (S20). When the handover control unit 15 is notified of the completion of the location registration, the handover control unit 15 sends a request to disconnect the base station to the wireless transmission/reception unit 12*a* (S21). When the wireless transmission/reception unit 12*a* receives the request to break connection with the base station, the wireless transmission/reception unit 12*a* starts a disconnection procedure with the base station 201 being currently connected (S22). When the wireless transmission/reception unit 12*a* completes the disconnection with the base station 201, the wireless transmission/reception unit 12*a* sends a signal reporting completion of the base station disconnection to the handover control unit 15 (S23). Then, the base station 201 enters into a waiting state. When the handover control unit 15 is notified of the completion of the base station disconnection from the wireless transmission/reception unit 12*a*, the mobile station 101 completes the handover from the base station 201 to the base station 202.

When the mobile station 101 completes the handover, the mobile station 101 uses the wireless transmission/reception unit 12*a* to start the base station search. The handover operations following the base station search using the wireless transmission/reception unit 12a are also performed through similar processes as described above.

As described above, when the mobile station 101 performs the handover in the wireless communication system of this embodiment, since the mobile station 101 can perform the handover after the connection with the handover destination base station 202 has been completed, a layer 2 seamless handover can be realized without disconnection between the mobile station and the base station, and without any packet loss. Then, if the mobile station 101 performs the data transfer, since the mobile station 101 uses only the data transfer MAC address, a frame transfer error by the L2SW as shown in FIG. 1 is not caused. In addition, since management with the location registration of the mobile station is controlled at layer 2, a throughput required for the handover by the mobile station becomes smaller compared with the control by layer 3.

In addition, although the mobile station 101 uses the multiple wireless interfaces, the mobile station 101 appropriately merges the received data and apportions the data, using the communication control function of the communication control unit 13. Thereby, the packet terminal 401 connected to the mobile station 101 can perform the data communication by using a single MAC address, without recognizing the multiple wireless interfaces. In other words, the packet terminal 401 can handle it as if a single wireless interface is used, and it is not necessary to mount any special device on the packet terminal.

It should be noted that although the above described embodiment is the best mode for carrying out the present invention, its main purpose is not to limit the present invention to the above described embodiment. Therefore, the above described embodiment can be modified in various ways within a range not changing the gist of the present invention. For example, the number of the wireless interfaces used in the mobile station is not only limited to two, but also two or more wireless interfaces can be used. Then, the MAC address reassignment can be arbitrarily designed. In addition, the address to be assigned to the wireless interface may not be the MAC address, but also may be another address such as an IP address.

DESCRIPTION OF REFERENCE NUMERALS

Figure 1:
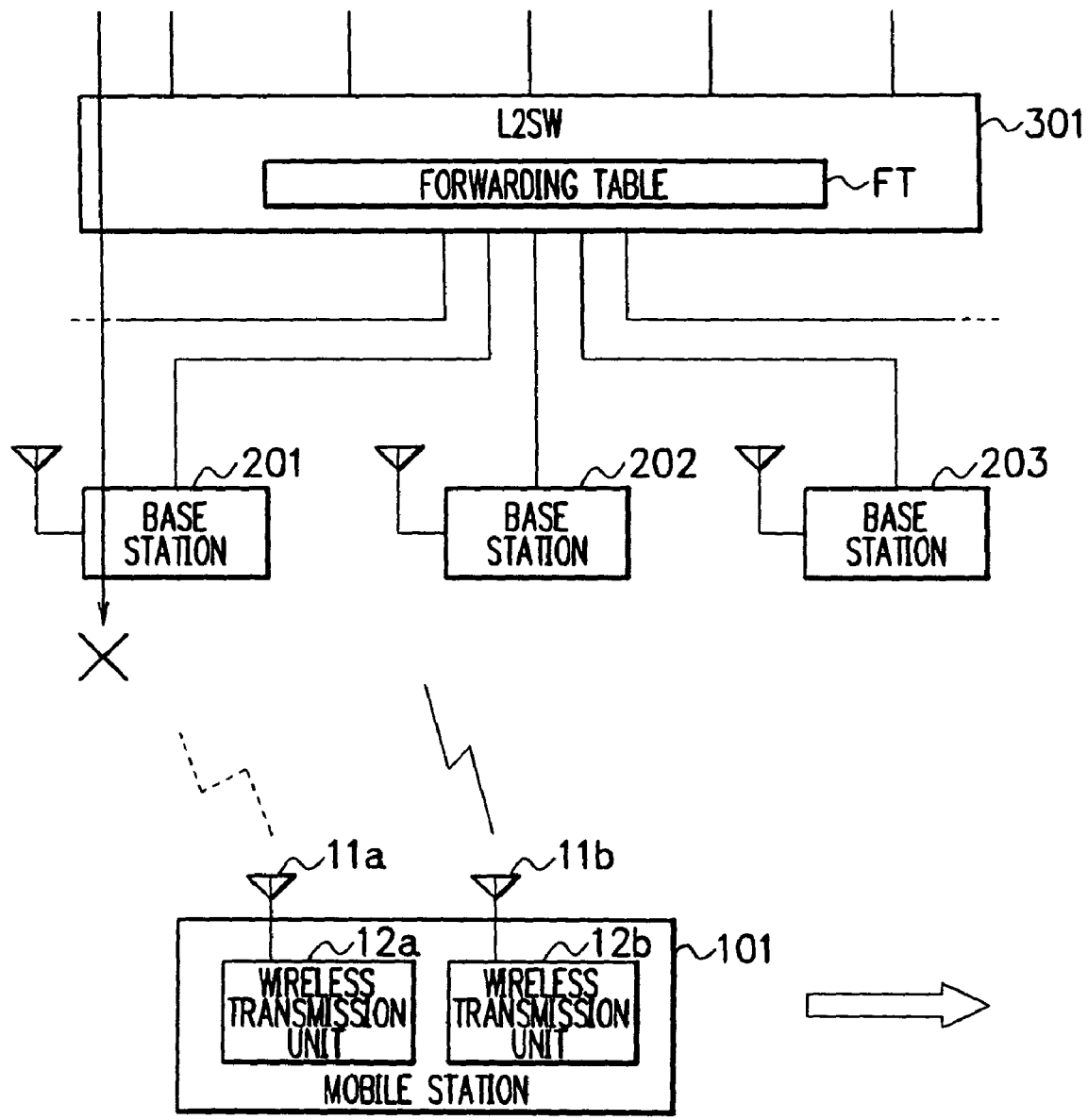
FIG. 1 shows an overall block diagram of a conventional wireless communication system.
Figure 2:
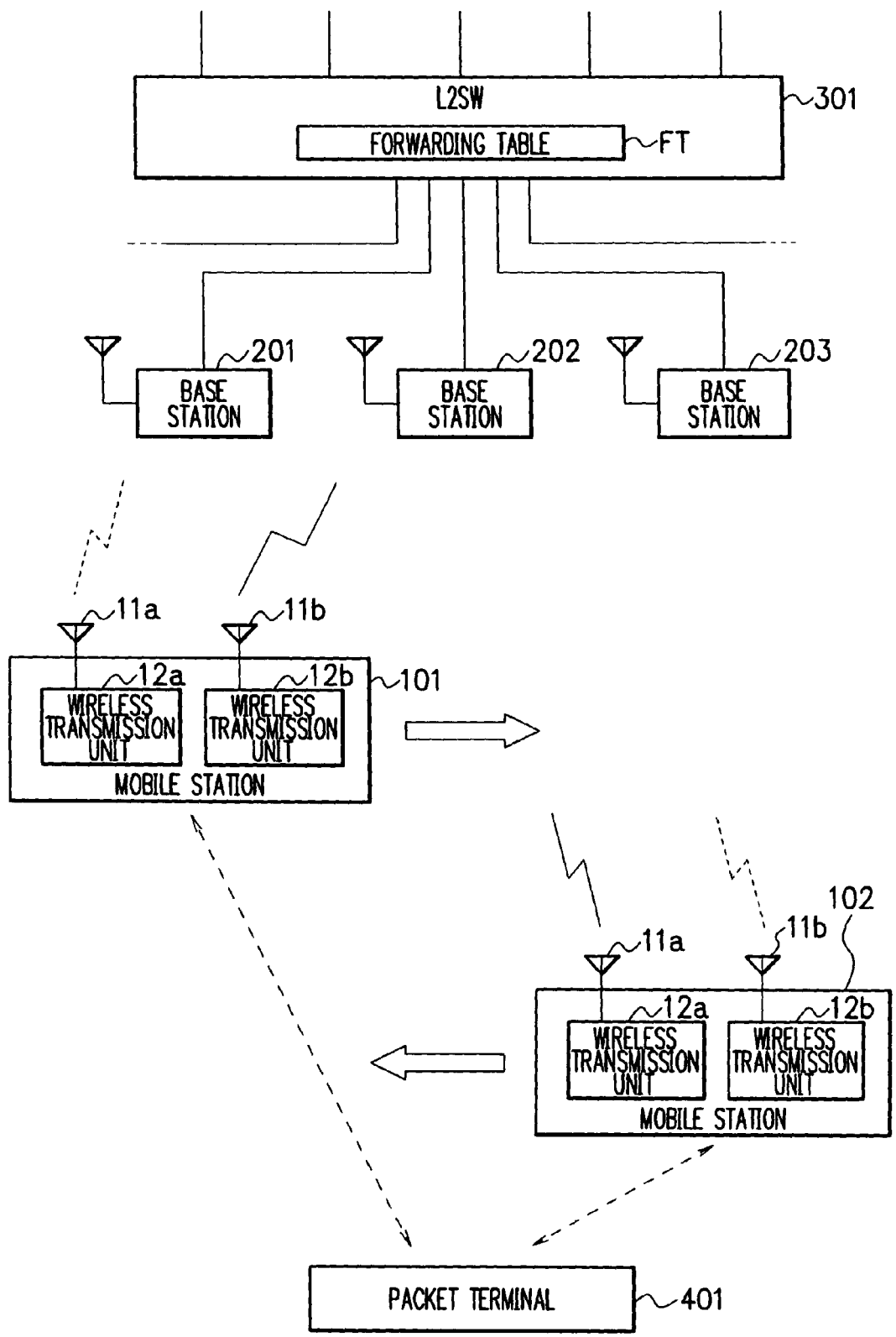
FIG. 2 shows an overall block diagram of a wireless communication system of this embodiment.
Figure 3:
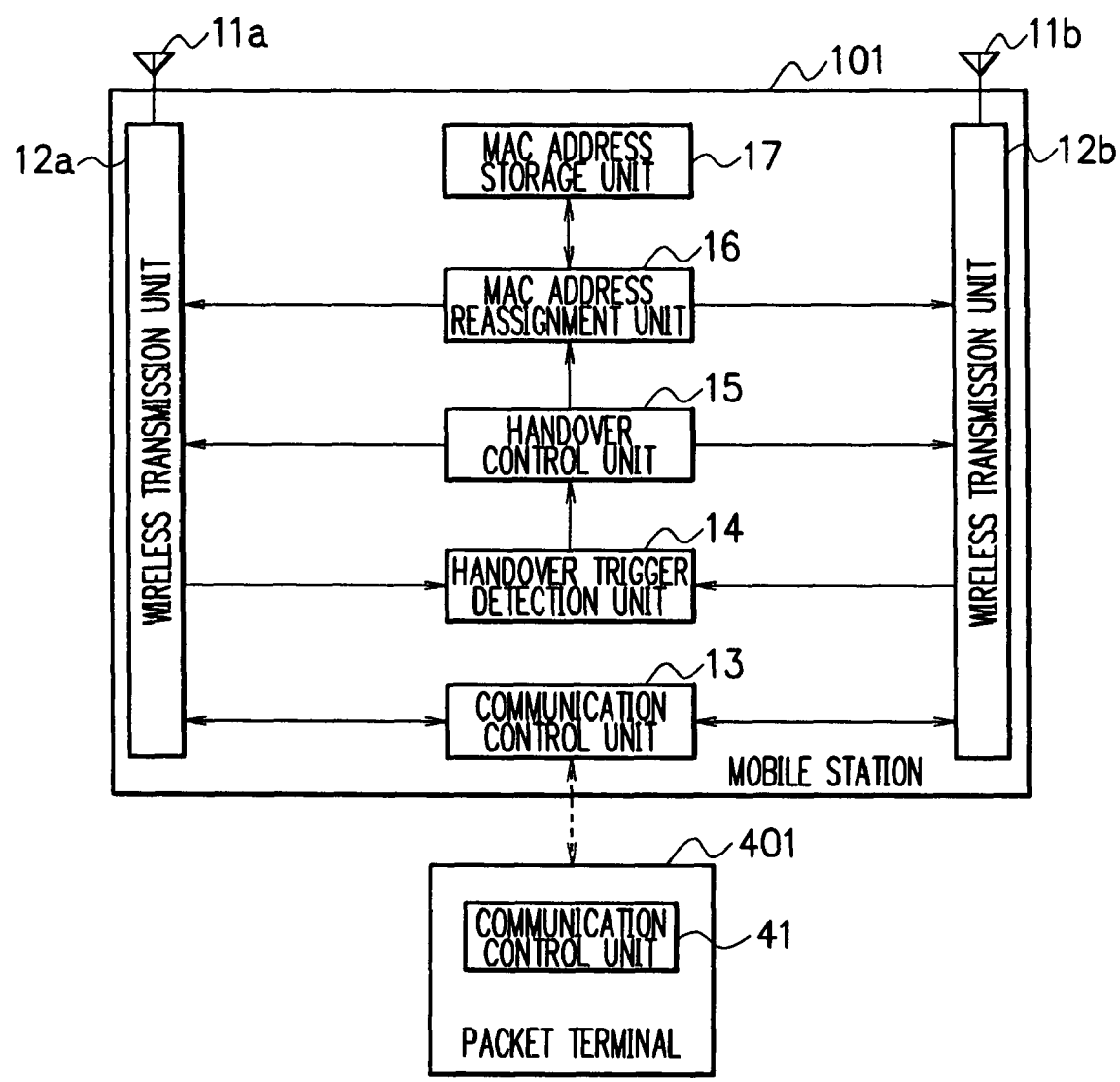
FIG. 3 shows an internal configuration block diagram of a mobile station 101 and an internal configuration block diagram of a packet terminal 401.
Figure 4:
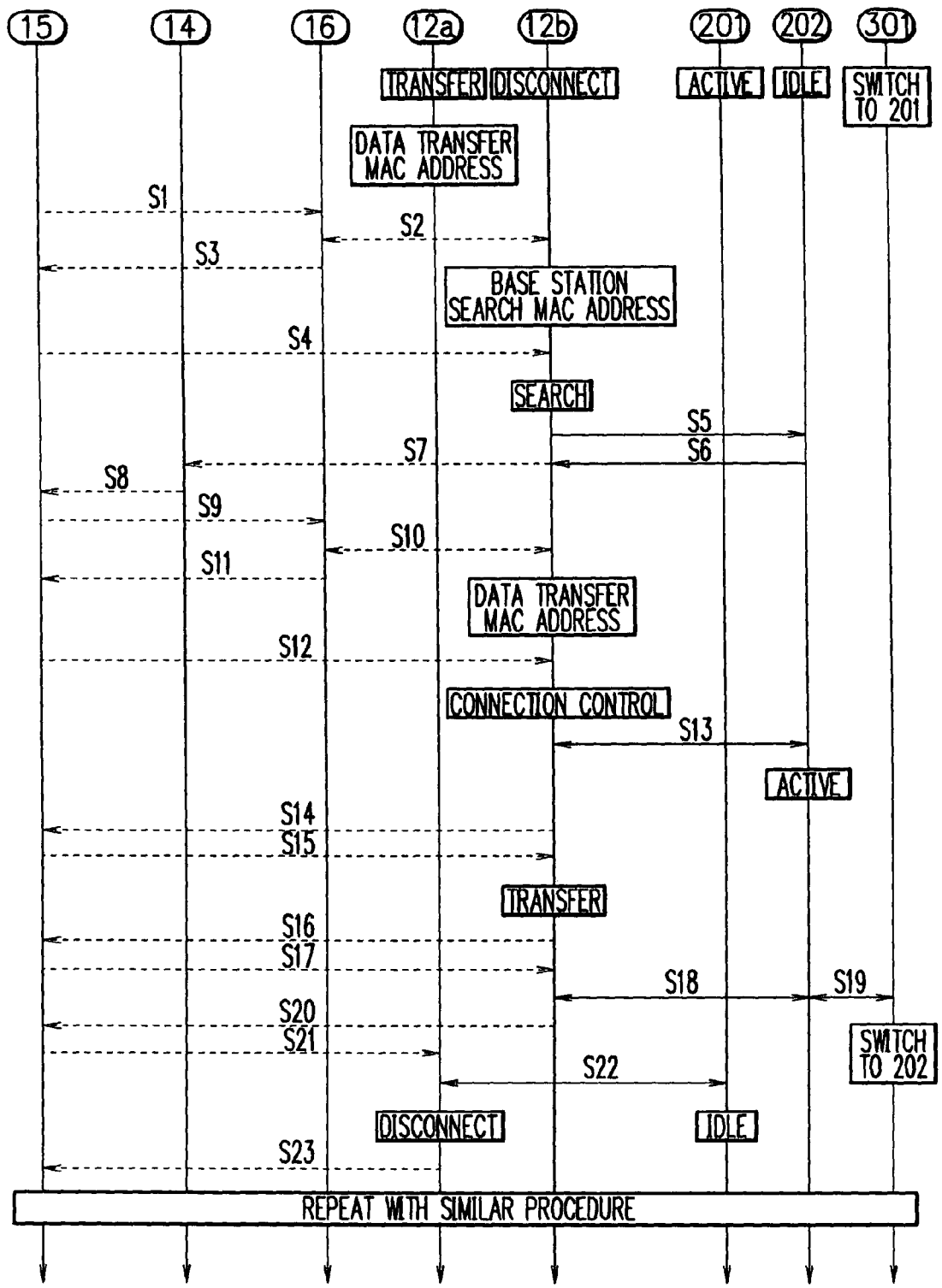
FIG. 4 is a sequence chart with respect to operations related to a handover control with MAC address reassignment.

101, 102 Mobile station
11a, b Antenna
12a, b Wireless transmission/reception unit
13 Communication control unit
14 Handover trigger detection unit
15 Handover control unit
16 MAC address reassignment unit
17 MAC address storage unit
201, 202 Base station
301 L2SW
FT Forwarding table
401 Packet terminal
41 Communication control unit

The invention claimed is:
1. A wireless communication system comprising:
a mobile station comprising two or more wireless interfaces to which addresses are changeably assigned;
a base station for performing a data transfer with said mobile station via said wireless interfaces;
a switch for connecting to said base station and switching base stations with which said data transfer is performed;
a terminal for performing data communication with said mobile station; and
address reassignment means for reassigning an address assigned to a first wireless interface of said two or more wireless interfaces to a second wireless interface,
wherein, when said mobile station performs a handover from a first base station to a second base station, said mobile station having used a first wireless interface with a first address as a data transfer address for a data transfer with said first base station before said handover:
the second wireless interface searches and connects to the second base station, using a second address different from said first address, as a search address;
the first wireless interface uses the first address to disconnect from the first base station after the second wireless interface completes the connection to the second base station; and
the first address assigned to the first wireless interface is reassigned to the second wireless interface to be used as a data transfer address for a data transfer between said mobile station and said second base station.

2. A mobile station comprising:
two or more wireless interfaces to which addresses are changeably assigned to at least two of said wireless interfaces;
handover control means for controlling a series of processes related to a handover;
address reassignment means for reassigning a first address assigned to a first wireless interface of said two or more wireless interfaces to a second wireless interface; and
address storage means for storing addresses, said addresses including at least one data transfer address, used by a wireless interface for data transfers between the mobile station and base stations, and at least one search address, used by a wireless interface for searching for base stations,
wherein, when the handover is performed, the address reassignment means reassigns the first address assigned to the first wireless interface, used before the handover as the data transfer address between the mobile station and a first base station, to the second wireless interface, to be the data transfer address between the mobile station and the second base station after the handover to the second base station.

3. The mobile station according to claim 2, further comprising handover trigger detection means for detecting a condition related to the handover as a trigger, wherein
when said handover trigger detection means detects said trigger, said handover control means performs processes related to the handover.

4. The mobile station according to claim 3, wherein said condition is based on a radio wave intensity received by said wireless interface from a base station.

5. The mobile station according to claim 2, further comprising communication control means for performing data communication with a terminal and controlling the communication, wherein for the data communication with said terminal during the handover, said communication control means performs communication control including a merging of received data, an apportioning of data, and a combination thereof.

6. A handover control method comprising:
in a mobile station having at least two wireless interfaces having assignable addresses, providing a base station search address and a data transfer address as selectively assignable to said at least two wireless interfaces;
searching for a base station, in a waiting state, by using the base station search address, as assigned to one of the wireless interfaces in said mobile station;
reassigning the address assigned to said one of the wireless interfaces in said mobile station to be a data transfer address, different from said base station search address;
performing a location registration for said mobile station by a switch that has received data on a location of said mobile station from the wireless interface to which said data transfer address is assigned; and
breaking connection with a base station that is in a connection state through another of the wireless interfaces in said mobile station.

7. The handover control method according to claim 6, further comprising the communication control means performing communication control of user data for a packet terminal.

8. The mobile station according to claim 4, wherein the handover trigger detection means monitors radio waves received by the wireless interfaces.

9. The mobile station according to claim 2, wherein the processes related to the handover comprise:
managing states of the wireless interfaces;
performing handover control; and
reassigning the addresses with respect to the wireless units.

10. The mobile station according to claim 3, wherein the handover comprises:
the handover control means sends a request for reassigning a base station search address in the second wireless interface to the address reassignment means;
the address reassignment means sets a base station search address for the second wireless interface;
the handover control means receives a completion of the address reassignment from the address reassignment means;
the handover control unit sends a request for starting a base station search to the second wireless interface;
the second wireless interface uses the base station search address to start the base station search;
the second wireless interface receives a base station search response from a second base station;
the second wireless interface notifies the handover trigger detection means of a communication quality parameter;
the handover trigger detection means notifies the handover control means;
the handover control means sends a request for reassigning a data transfer address in the second wireless interface to the address reassignment means;
the address reassignment means sets the data transfer address to the second wireless interface;
the address reassignment means sends a signal reporting a completion of the address reassignment to the handover control means;
the handover control unit sends a request for connecting to the second base station to the second wireless interface;
the second wireless interface starts a connection with the second base station;
the second wireless interface sends a signal reporting a completion of the connection to the handover control means;
the handover control means sends a request for a data transfer start to the second wireless interface;
the second wireless interface sends a signal reporting a completion of setting the data transfer start to the handover control means;
the handover control means sends a request for registering a location to the second wireless interface;
the second wireless interface sends a location registration frame via the second base station to a switch;
the switch updates a forwarding table and starts to switch a frame having a destination address which is the data transfer address to the second base station;
the second wireless interface sends a signal reporting a completion of the location registration to the handover control means;
the handover control means sends a request for disconnecting a first base station to the first wireless interface;
the first wireless interface starts a disconnection procedure with the first base station; and
the first wireless interface sends a signal reporting a completion of the base station disconnection to the handover control means.

11. The mobile station according to claim 10, wherein the address reassignment means obtains the base station search address for the second wireless interface from the address storage means.

12. The mobile station according to claim 10, wherein the addresses comprise media access control (MAC) addresses.

13. The mobile station according to claim 10, wherein the handover trigger detection means monitors the communication quality parameter notified from the base station.

14. The mobile station according to claim 13, wherein the handover trigger detection means notifying the handover control means comprises sending information that a handover destination base station, comprising the second base station, was found.

15. The mobile station according to claim 10, wherein, prior to the handover, the data transfer address is set to the first wireless interface and the first wireless interface is connected to the first base station.

16. The mobile station according to claim 10, wherein, the second wireless interface enters a state where it can start a data transfer after the handover control means sends the request for the data transfer start.

17. The handover control method according to claim 7, wherein the packet terminal connected to the mobile station performs the data communication by using a single address without recognizing the multiple wireless interfaces.

18. The mobile station according to claim 2, wherein the address reassignment is arbitrarily designated.

19. A wireless communication system comprising:
the mobile station according to claim 10 connected to a packet terminal; and
a switch connected to a plurality of base stations.

20. The mobile station according to claim 2, wherein each wireless interface in said mobile station is selectively assigned a reassignable address.

21. The mobile station according to claim 10, wherein the addresses comprise Internet Protocol (IP) addresses.

* * * * *